US012804355B2

(12) United States Patent
Rao et al.

(10) Patent No.: US 12,804,355 B2
(45) Date of Patent: Nov. 17, 2026

(54) VERIFICATION AND DYNAMIC MODIFICATION OF MULTIPLE LOCATION SOURCE SELECTION SYSTEM FOR USER DEVICE LOCATION DETECTION

(71) Applicant: DISH Wireless L.L.C., Englewood, CO (US)

(72) Inventors: Raghavendhra Rao, Littleton, CO (US); Mehdi Alasti, Herndon, VA (US)

(73) Assignee: DISH WIRELESS L.L.C., Englewood, CO (US)

( * ) Notice: Subject to any disclaimer, the term of this patent is extended or adjusted under 35 U.S.C. 154(b) by 304 days.

(21) Appl. No.: 18/630,808

(22) Filed: Apr. 9, 2024

(65) Prior Publication Data

US 2025/0317709 A1 Oct. 9, 2025

(51) Int. Cl.
*H04W 4/029* (2018.01)
*H04W 4/90* (2018.01)

(52) U.S. Cl.
CPC .............. *H04W 4/029* (2018.02); *H04W 4/90* (2018.02)

(58) Field of Classification Search
CPC .......... H04W 4/029; H04W 4/90; H04W 4/02
See application file for complete search history.

(56) References Cited

U.S. PATENT DOCUMENTS 8,818,344 B2 * 8/2014 Forbes .............. H04M 3/42034 379/88.19
10,241,211 B2 * 3/2019 Perdue .................... G01S 19/05
2001/0022558 A1 * 9/2001 Karr, Jr. ................ G01S 5/0278 342/450
2002/0173317 A1 11/2002 Nykanen et al.
2008/0256097 A1 * 10/2008 Messer ................... H04L 67/51
2011/0077862 A1 * 3/2011 Huang ................... G01C 21/30 701/532

(Continued)

FOREIGN PATENT DOCUMENTS

WO 2022/212484 A1 10/2022

OTHER PUBLICATIONS

International Search Report and Written Opinion for PCT Application No. PCT/US2024/039194, dated Oct. 28, 2024, 16 pages.

*Primary Examiner* — Steve N Nguyen
(74) *Attorney, Agent, or Firm* — Seed Intellectual Property

(57) ABSTRACT

System and method for verifying a source selection mechanism that selects location data from multiple sources for location-based services. One or a plurality of sequences of simulated location data are generated for a plurality of simulated sources. Each corresponding sequence includes a plurality of simulated location data for a corresponding simulated actual location. An expected source selection is set for the corresponding sequence. A source selection mechanism is employed on the corresponding sequence to generate an actual source selection that represents the corresponding simulated actual location. In response to the actual source selection failing to match the expected source selection for the corresponding sequence, the corresponding sequence is labeled as an anomalous selection by the source selection mechanism. And in response to the actual source selection matching the expected source selection for the corresponding sequence, the corresponding sequence is labeled as a verified selection by the source selection mechanism.

19 Claims, 5 Drawing Sheets

(56) References Cited

U.S. PATENT DOCUMENTS

| | | | | |
|---|---|---|---|---|
| 2014/0236476 | A1* | 8/2014 | Khorashadi | G01S 5/02521 701/445 |
| 2022/0322055 | A1 | 10/2022 | Zorgui et al. | |
| 2023/0189024 | A1* | 6/2023 | Tran | H04W 24/06 370/252 |

* cited by examiner

VERIFICATION AND DYNAMIC MODIFICATION OF MULTIPLE LOCATION SOURCE SELECTION SYSTEM FOR USER DEVICE LOCATION DETECTION

BACKGROUND

Mobile phones are being used more and more by more and more people. As the use of mobile phones has increased, so too has the need to make 911 calls from mobile phones. The speed at which emergency services can respond to a 911 call relies on identifying the caller's location. Unfortunately, many callers are unable to provide their location. As a result, the Federal Communications Commission has required cellular service providers to obtain and provide the mobile phone's location to the emergency services within a certain level of accuracy. Similarly, many mobile phones have other applications or other services that rely on or use location information. But mobile phones can be unreliable in providing or obtaining accurate location information. Moreover, testing location-based information can be difficult due to the number of variables associated with collecting location information. It is with respect to these and other considerations that the embodiments described herein have been made.

BRIEF SUMMARY

Embodiments are directed towards systems and methods for verifying a source selection mechanism that selects location data from multiple sources for location-based services of user devices. A sequence of simulated location data for a plurality of simulated sources is generated for a simulated actual location. In various embodiments, a plurality of sequences are generated for separate simulated actual locations. The sequence of simulated location data may be generated by selecting a horizontal location uncertainty and a vertical location uncertainty for each of the plurality of simulated sources. A simulated horizontal location is then selected based on the simulated actual location and the horizontal location uncertainty, and a simulated vertical location is selected based on the simulated actual location and the vertical location uncertainty. An expected source selection by the source selection mechanism is set from the plurality of simulated sources. The source selection mechanism is then employed on the sequence of simulated location data to determine an actual source selection that represents the simulated actual location. In response to the actual source selection matching the expected source selection, the sequence of simulated location data is labeled as a verified selection by the source selection mechanism. And in response to the actual source selection failing to match the expected source selection, the sequence of simulated location data is labeled as an anomalous selection by the source selection mechanism. In various embodiments, the sequence of simulated location data may be modified based on an error probability for each of the plurality of simulated sources, such as by nullifying simulated horizontal location data or simulated vertical location data for a simulated source based on the error probability for the simulated source.

Embodiments described herein improve the optimization, efficiency, and effectiveness of source selection mechanisms of user devices using location-based services, such as mobile phones making 911 calls. By generating sequences of simulated location data for a plurality of simulated sources, as described herein, the accuracy and efficiency of the source selection mechanisms can be improved, which also improves the user device's ability to accurately obtain and provide is location for the location-based service.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, actions, or characteristics of the present disclosure, and are not limited to the same or different embodiments unless the context clearly dictates otherwise. Furthermore, the described features, structures, functions, limitations, actions, or characteristics may be combined in any suitable manner in accordance with this disclosure, and references to "in one embodiment," "in another embodiment," "in various embodiments," "in some embodiments," "in other embodiments," etc., do not preclude the combination of the features, structures, functions, limitations, actions, or characteristics in any of the embodiments described herein. Accordingly, embodiments described herein can be combined in any combination unless the context clearly dictates otherwise.

As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
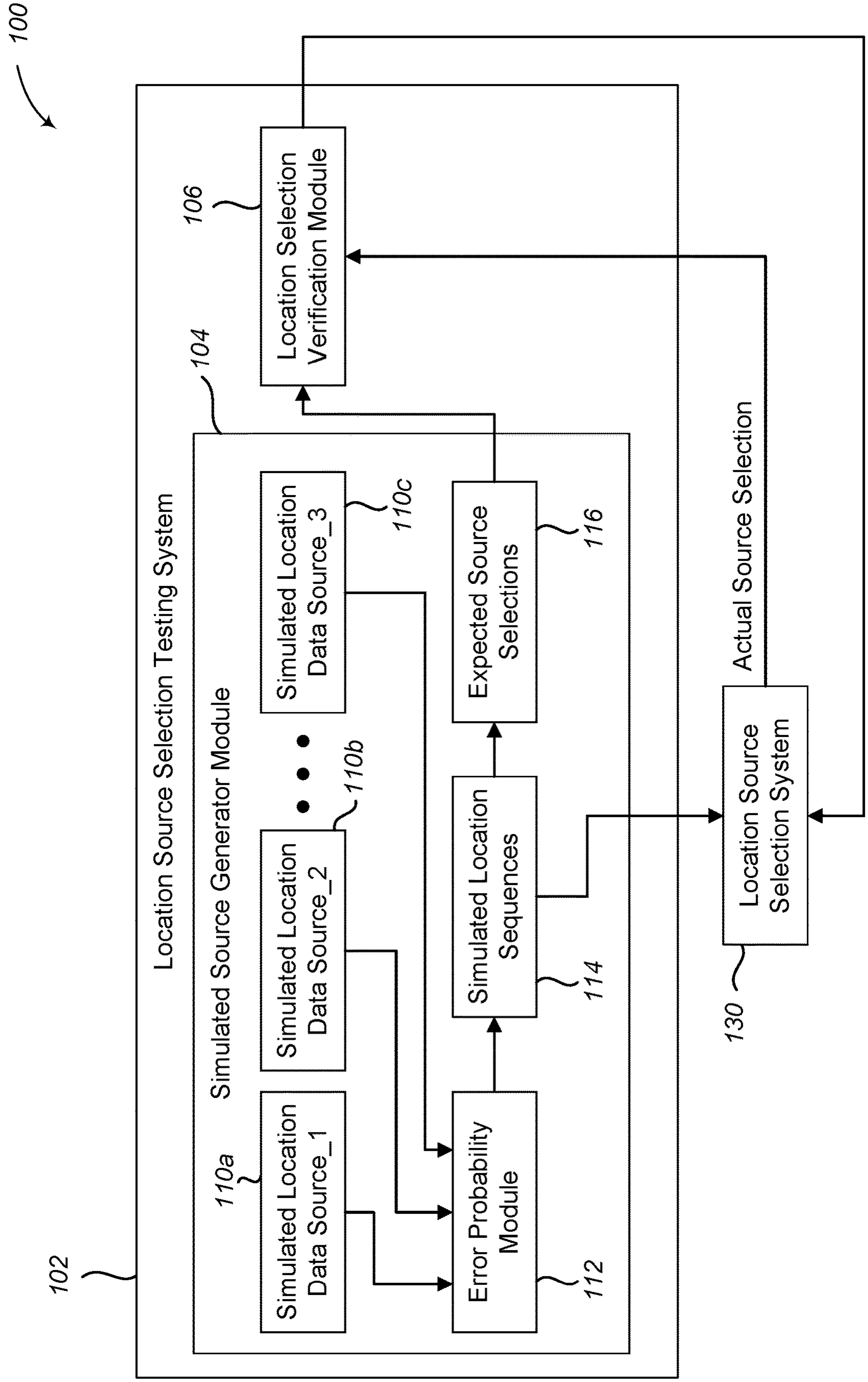
FIG. 1 illustrates a context diagram of a non-limiting embodiment of an environment for generating simulated location data from multiple sources and verifying selection of location data from the multiple sources for a location-based service of a user device in accordance with embodiments described herein.

FIG. 1 illustrates a context diagram of a non-limiting embodiment of an environment 100 for generating simulated location data from multiple sources and verifying selection of location data from the multiple sources for a location-based service of a user device in accordance with embodiments described herein. Environment 100 includes a location source selection testing system 102 and a location source selection system 130.

The location source selection system 130 is configured to employ a source selection mechanism on simulated location data received from the location source selection testing system 102. Briefly, the source selection mechanism analyzes the simulated location data from a plurality of sources for a particular sequence to dynamically select location data that meets location-accuracy compliance requirements. The selected location data is output as the actual source selection of the location source selection system 130 to the location source selection testing system 102. In various embodiments, the simulated location data may include simulated information regarding one or more simulated actual locations. Thus, the simulated location data may include a simulated horizontal location, a corresponding simulated horizontal location uncertainty value, a simulated vertical location, and a corresponding simulated vertical location uncertainty value.

To validate the accuracy of the location source selection system 130, the location source selection system 130 would need to be tested at a plurality of different locations with a plurality of different combinations of sources, which would require access to buildings and different morphologies (e.g., different types of indoor and outdoor environments, which may include real or representative building or environments). But such testing in the lab or in real world would be resource expensive, in manpower, time, and tools. As such, it would be difficult to test all situations and scenarios to identify corner scenarios where the location source selection system 130 is inaccurate. The location source selection testing system 102 described herein enables a more comprehensive testing of the location source selection system 130 to validate and improve the location source selection system 130.

The location source selection testing system 102 is configured to generate simulated location data and to test or verify the actual source selections made by the location source selection system 130 for that simulated location data. The location source selection testing system 102 includes a simulated source generator module 104 and a location selection verification module 106.

The simulated source generator module 104 is configured to generate a plurality of sequences 114 of simulated location data. Each separate sequence of simulated data represents a separate simulated actual location (including a simulated actual horizontal location and a simulated actual vertical location). And each separate sequence includes simulated horizontal location data (e.g., a simulated horizontal location and a simulated horizontal location uncertainty value) and simulated vertical location data (e.g., a simulated vertical location and a simulated vertical location uncertainty value) from a plurality of simulated sources 110*a*-110*c*. Thus, the simulated location data for a particular simulated source includes a simulated horizontal location representative of the simulated actual horizontal location for the particular simulated source, a corresponding simulated horizontal location uncertainty value for the simulated horizontal location, a simulated vertical location representative of the simulated actual vertical location for the particular simulated source, and a corresponding simulated vertical location uncertainty value for the simulated horizontal location.

For each sequence of simulated location data from the plurality of simulated sources 110*a*-110*c*, the simulated source generator module 104 may use an error probability module 112 to modify each sequence by employing an error probability against each simulated location data to nullify some small portion of the simulated location data. The error probability module 112 mimics actual sources in how often they may provide no data, bad data, incorrect data, incomplete data, or missing data. The simulated source generator module 104 stores the generated and modified simulated location sequences 114. Thus, the simulated location sequences 114 includes a plurality of simulated sequences, where each separate sequence includes simulated location data for a plurality of simulated sources. And for each corresponding simulated location sequence 114, the simulated source generator module 104 stores an expected source selection 116 from the corresponding sequence. The expected source selections 116 are the simulated sources associated with the simulated location data that meets one or more location-accuracy compliance requirements or would be deemed as the optimal source relative to the other simulated sources by the location source selection system 130. In some embodiments, the simulated location sequences and their expected source selections are stored in a table or other suitable data structure. In at least one embodiment, the error probability module 112 may be optional and not included or utilized.

The location selection verification module 106 is configured to compare the expected source selection 116 for a particular simulated location sequence 114 with the actual source selection made by the location source selection system 130 for that particular simulated location sequence 114. If the actual source selection matches the expected source selection for a particular simulated location sequence, then that sequence is labeled as verified. But if the actual source selection does not match the expected source selection for a particular simulated location sequence, then that sequence is labeled as anomalous. In some embodiments, the location selection verification module 106 provides the results of the comparisons for each sequence back to the location source selection system 130 to retrain or further improve the source selection mechanism being employed.

Although the simulated source generator module 104 and the location selection verification module 106 are illustrated as separate modules, embodiments are not so limited.

Rather, one module (or system) or a plurality of modules (or systems) may be utilized to perform the functionality of the simulated source generator module 104 and the location selection verification module 106.

Moreover, although the location source selection testing system 102 and the location source selection system 130 are illustrated as separate computing systems, embodiments are not so limited. Rather, one computing device or system or a plurality of computing devices or systems may be utilized to perform the functionality of the location source selection testing system 102 and the location source selection system 130.

The operation of certain aspects will now be described with respect to FIGS. 2-4. In at least one of various embodiments, processes 200, 300, and 400 described in conjunction with FIGS. 2-4, respectively, may be implemented by or executed via circuitry or on one or more computing devices, such as location source selection testing system 102 in FIG. 1.

Figure 2:
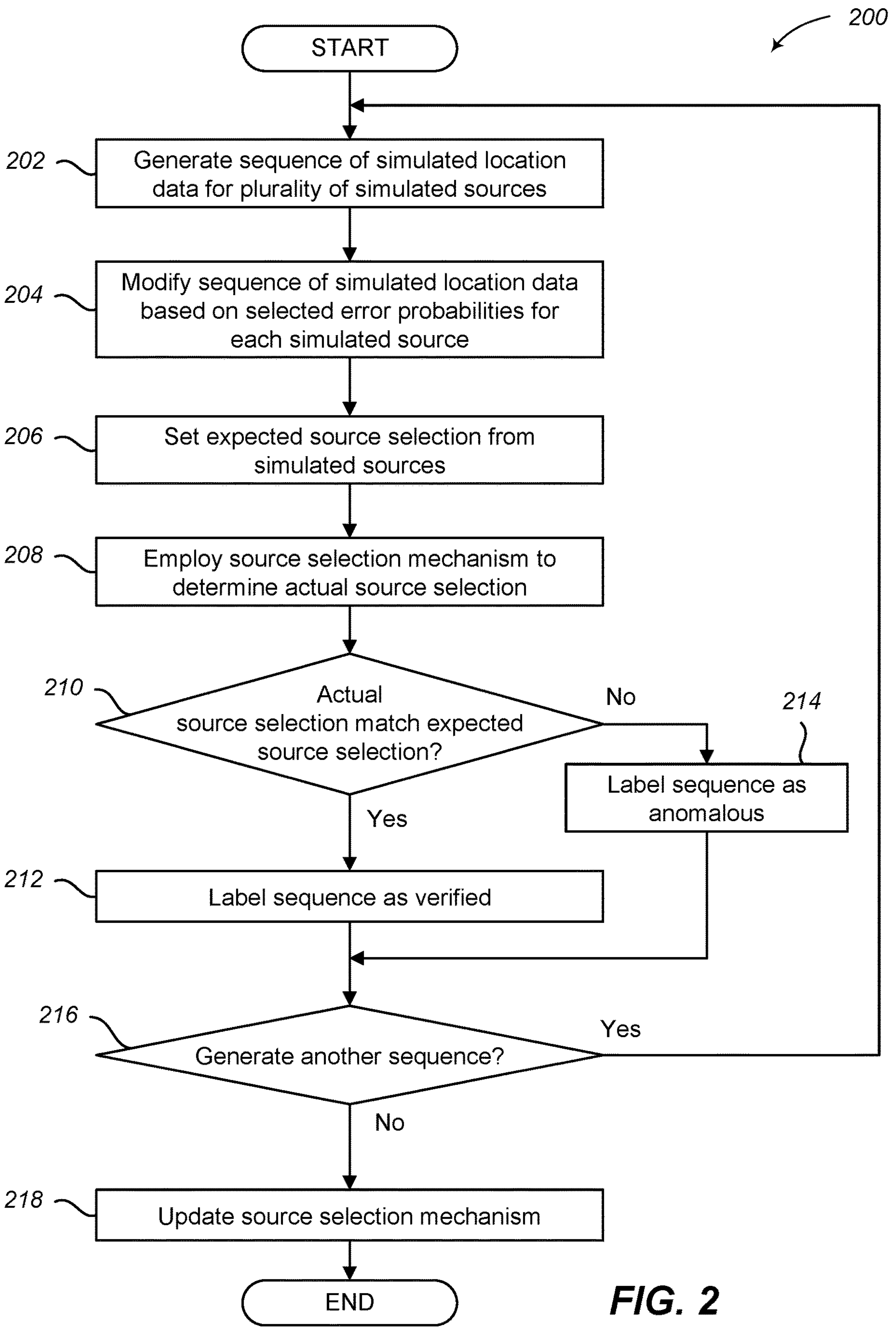
FIG. 2 illustrates a logical flow diagram showing one embodiment of a process for verifying selection of location data from multiple sources for a location-based service of a user device in accordance with embodiments described herein.

FIG. 2 illustrates a logical flow diagram showing one embodiment of a process 200 for verifying selection of location data from multiple sources for a location-based service of a user device in accordance with embodiments described herein.

Process 200 begins, after a start block, at block 202, where a sequence of simulated location data is generated for a plurality of simulated sources, which is described in more detail below in conjunction with FIG. 3. Briefly, however, simulated horizontal location data (e.g., a simulated horizontal location and a simulated horizontal location uncertainty value) and simulated vertical location data (e.g., a simulated vertical location and a simulated vertical location uncertainty value) are generated for each of a plurality of simulated sources based on a simulated actual horizontal location and a simulated actual vertical location in conjunction with simulated horizontal location uncertainty and simulated vertical location uncertainty values. The simulated horizontal location data may include a simulated horizontal location that represents an actual horizontal position on Earth. In some embodiments, the simulated horizontal location data may also include the simulated horizontal location uncertainty. And the simulated vertical location data may include a simulated vertical location that represents an actual vertical position relative to Earth. In some embodiments, the simulated vertical location data may also include the simulated vertical location uncertainty.

In various embodiments, the simulated location data is artificial, imitation, or fake location data that represents location data that could have come from one or more real location sources. For illustration purposes, examples of real location sources may include horizontal location sensors or systems that capture horizontal location data of a user device at the time of using a location-based service (e.g., calling 911) and vertical location sensors or systems to capture vertical location data of the user device at the time of using the location-based service. Examples of horizontal location sensors or systems may include, but are not limited to, Global Navigation Satellite System (GNSS) data (e.g., Global Positioning System (GPS), GLONASS, BeiDou, Galileo, Indian Regional Navigation Satellite System (IRNSS), Quasi-Zenith Satellite System (QZSS), WiFi, Bluetooth Low Energy (BLE), other horizontal positional sensors (e.g., accelerometers or gyroscopes), or the like), cell tower triangulation, cell identification (e.g., a location of the cell tower in which the user device is communicating), enhanced cell identification (e.g., a relative direction or distance from the location of the cell tower in which the user device is communicating and few neighboring cell towers in which the user device can measure their received power), or other systems configured to capture a horizontal location of a user device using a location-based service. Examples of vertical location sensors or systems may include, but are not limited to, Global Positioning System (GPS) data, Global Navigation Satellite System (GNSS) data (e.g., Global Positioning System (GPS), GLONASS, BeiDou, Galileo, Indian Regional Navigation Satellite System (IRNSS), Quasi-Zenith Satellite System (QZSS), WiFi, Bluetooth Low Energy (BLE), other vertical positional sensors (e.g., accelerometers or gyroscopes), barometric positioning sensors, or the like), barometric sensor, enhanced barometric sensor (e.g., biometric sensor data calibrated to the horizontal location of the user device or to the current weather at the horizontal location of the user device), crowdsourced data based on known Wi-Fi hot spots, RF finger-printing, beacons, or other systems configured to capture a vertical location of the user device using a location-based service. These real location sources are provided for illustration purposes. Embodiments described herein generate sequences of simulated location data for multiple simulated sources and does not include actually-captured location data from a real source, those sequences of simulated location data are then utilized to determine if location data is correctly selected from one or more simulated sources given the simulated location data.

In some embodiments, the simulated sources may be selected as being asynchronous and independent of one another. Moreover, the simulated location data may be randomly selected or selected using one or more assumptions or constraints. For example, the simulated location data may be selected within a uniform selected confidence level (e.g., 90%).

Process 200 proceeds, after block 202, to block 204, where the sequence of simulated location data is modified based on selected error probabilities for each simulated source, which is described in more detail below in conjunction with FIG. 4. Briefly, however, an error probability is selected for each simulated source such that the simulated location data for that simulated source is converted to null data in accordance with that error probability.

Process 200 continues, after block 204, at block 206, where an expected source selection is set from the simulated sources. The expected source selection is the simulated source associated with the simulated location data that meets one or more location-accuracy compliance requirements or would be deemed as the optimal source relative to the other simulated sources. In some embodiments, the expected source may be a combination of sources where a first expected source is set as having optimal simulated horizontal location uncertainty and a second expected source (that is different from the first expected source) is set as having optimal simulated vertical location uncertainty. In various embodiments, the expected source selected is set by a user or an administrator based on the sequence of simulated location data.

Process 200 proceeds, after block 206, at block 208, where a source selection mechanism is employed to determine an actual source selection. The actual source selection is the simulated source that is selected from the plurality of sources by employing the source selection mechanism on the sequence of simulated location data for the plurality of sources. In this way, the accuracy of the source selection mechanism is tested using the sequence of simulated location data.

In various embodiments, the source selection mechanism analyzes the simulated location data from the plurality of sources for the sequence to dynamically select location data that meets location-accuracy compliance requirements. In some embodiments, the source selection mechanism may employ one or more decision engines to select the simulated location data and the corresponding source. The one or more decision engines can utilized trained artificial intelligence or machine learning models to determine which sources are compliant or non-compliant, to determine an optimal source when there are multiple compliant sources, to determine an optimal source when there are no compliant sources, or to mix and match separate sources as having optimal horizontal or vertical location data. Such artificial intelligence or machine learning models may be trained using several real-world location sources, along with actual location measurements and their uncertainty values. The training may involve teaching, for example, a neural network how to select location data using embodiments described herein and the location uncertainties from multiple sources.

Examples of the source selection mechanism are described in U.S. patent application Ser. No. 18/610,060, filed on Mar. 19, 2024; U.S. patent application Ser. No. 18/610,063, filed on Mar. 19, 2024; and U.S. patent application Ser. No. 18/610,066, filed on Mar. 19, 2024; each of which are incorporated herein in their entirety.

Process 200 continues, after block 208, at decision block 210, where a determination is made whether the actual source selection matches the expected source selection. In various embodiments, the actual source selection is compared to the expected source selection to determine if there is a match. If the actual source selection matches the expected source selection, then process 200 flows to block 212 where the sequence is labeled as verified with the source being correctly selected; otherwise, process 200 flows to block 214 where the sequence is labeled as anomalous with the source being not correctly selected.

After block 212 or block 214, process 200 continues at decision block 216. At decision block 216, a determination is made whether another sequence of simulated location data is generated for the plurality of simulated sources (the same plurality of simulates sources or a different plurality of simulated sources). In various embodiments, a plurality of different sequences are generated such that their expected source selections are compared to the actual source selections determined by the source selection mechanism. In this way, the system can identify one or a plurality of sequences that are anomalous with the source being incorrectly selection. By identifying the anomalous sequences, the source selection mechanism can be modified or updated to account for the types of location data that led to the incorrect source selection. If another sequence of simulated location data is to be generated process 200 loops to block 202; otherwise, process 200 flows to block 218.

At block 218, the source selection mechanism is updated based on the verified sequences, the anomalous sequences, or a combination of both. In some embodiments, the source selection mechanism may be retrained using the verified or anomalous sequences. In other embodiments, the source selection mechanism may be modified to include specific rules for processing real location data that mimics anomalous sequences.

In various embodiments, the anomalous sequences can be used to identify any corner scenarios that the source selection mechanism may have missed or had difficulty in selecting the correct source or location data. Accordingly, the outcome of the testing of the source selection mechanism with a plurality of simulated location data can be used to modify or adjust the source selection mechanism to include those corner scenarios. In this way, the testing the source selection mechanism using simulated location data provides a feedback loop that is used to update or modify the source selection mechanism.

After block 218, process 200 terminates or otherwise returns to a calling process to perform other actions.

Figure 3:
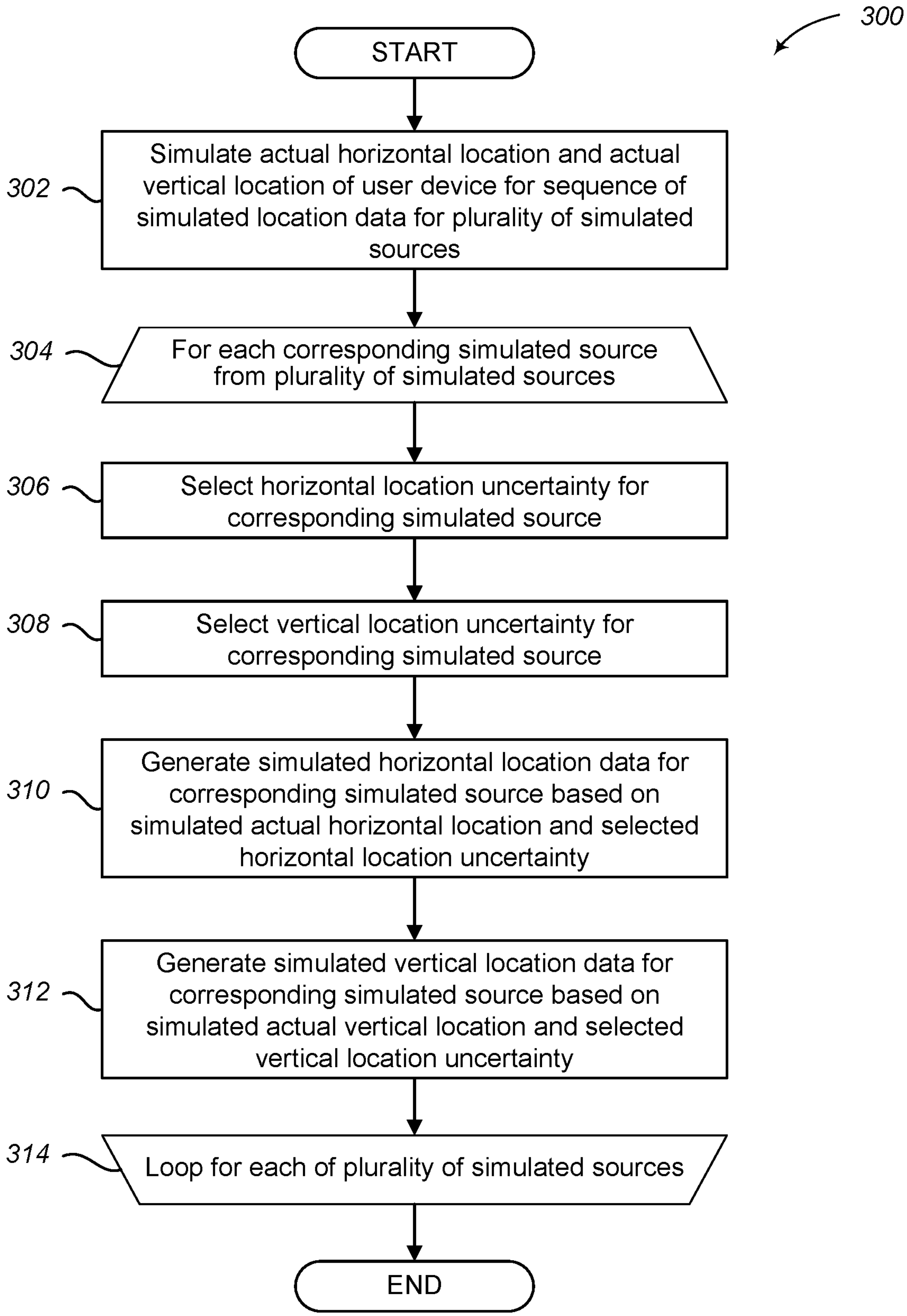
FIG. 3 illustrates a logical flow diagram showing one embodiment of a process for generating simulated location data for multiple sources in accordance with embodiments described herein.

FIG. 3 illustrates a logical flow diagram showing one embodiment of a process 300 for generating simulated location data for multiple sources in accordance with embodiments described herein. As noted above, process 300 may be performed as a sub-process at block 202 of process 200 in FIG. 2. Thus, the simulated horizontal location data and the simulated vertical location data generated in process 300 for a plurality of simulated sources are for a particular sequence of simulated location data.

Process 300 begins, after a start block, at block 302, where an actual horizontal location and an actual vertical location are simulated for a user device for a particular sequence of simulated location data for a plurality of sources. The simulated actual horizontal location and the simulated actual vertical location are generated or selected values to represent a physical location of a user device on Earth, without the user device actually being at that physical location. Accordingly, the simulated actual horizontal location defines a real-world horizontal location (e.g., a GPS location) on Earth as a simulated position of a user device, and the simulated actual vertical location defines a real-world vertical location (e.g., an altitude relative to mean sea level) on Earth as a simulated position of the user device.

Process 300 proceeds, after block 302, to block 304, where each corresponding simulated source is selected from a plurality of simulated sources to be processed.

For each corresponding source, process 300 proceeds, after block 304, to block 306, where a horizontal location uncertainty is selected for the corresponding simulated source. In at least one embodiment, the horizontal location uncertainty is a distance value in meters indicating how far off simulated horizontal location data is from the simulated actual horizontal location, or an estimate of how far off the corresponding source calculates the horizontal location data to be from the simulated actual horizontal location.

Process 300 continues, after block 306, at block 308, where a vertical location uncertainty is selected for the corresponding simulated source. In at least one embodiment, the vertical location uncertainty is a distance value in meters indicating how far off simulated vertical location data is from the simulated actual vertical location, or an estimate of how far off the corresponding source calculates the vertical location data to be from the simulated actual vertical location.

Process 300 proceeds, after block 308, at block 310, where the simulated horizontal location data is generated for the corresponding simulated source based on the simulated actual horizontal location and the selected horizontal location uncertainty. In some embodiments, the simulated horizontal location data is a combination (or difference) of the simulated actual horizontal location and the selected horizontal location uncertainty. For example, if the selected horizontal location uncertainty is 2.5 meters, then the simulated horizontal location data is generated to be 2.5 meters from the simulated actual horizontal location in a selected horizontal direction. This selected horizontal direction may be randomly selected, selected by a user or administrator, selected based on predefined directional criteria (e.g., the selected horizontal direction may be the same or different for each corresponding simulated source), or otherwise selected such that the simulated horizontal location data is generated to be offset from the simulated actual horizontal location by the selected horizontal uncertainty. In some embodiments, the simulated horizontal location data include a simulated horizontal location and the selected horizontal uncertainty.

Process 300 continues, after block 310, at block 312, where the simulated vertical location data is generated for the corresponding simulated source based on the simulated actual vertical location and the selected vertical location uncertainty. In some embodiments, the simulated vertical location data is a combination (or difference) of the simulated actual vertical location and the selected vertical location uncertainty. For example, if the selected vertical location uncertainty is 1.0 meters, then the simulated vertical location data is generated to be 1.0 meters higher or lower (i.e., a selected vertical direction) than the simulated actual vertical location. In some embodiments, the selected vertical direction may be randomly selected, selected by a user or administrator, selected based on predefined directional criteria, or otherwise selected such that the simulated vertical location data is generated to be offset from the simulated actual vertical location by the selected vertical uncertainty. In some embodiments, the simulated vertical location data include a simulated vertical location and the selected vertical uncertainty.

Process 300 proceeds, after block 312, to block 314, which loops to block 304 to process each corresponding simulated source to generate simulated horizontal location data and simulated vertical location data for that corresponding simulated source.

After block 314, process 300 terminates or otherwise returns to a calling process to perform other actions.

Figure 4:
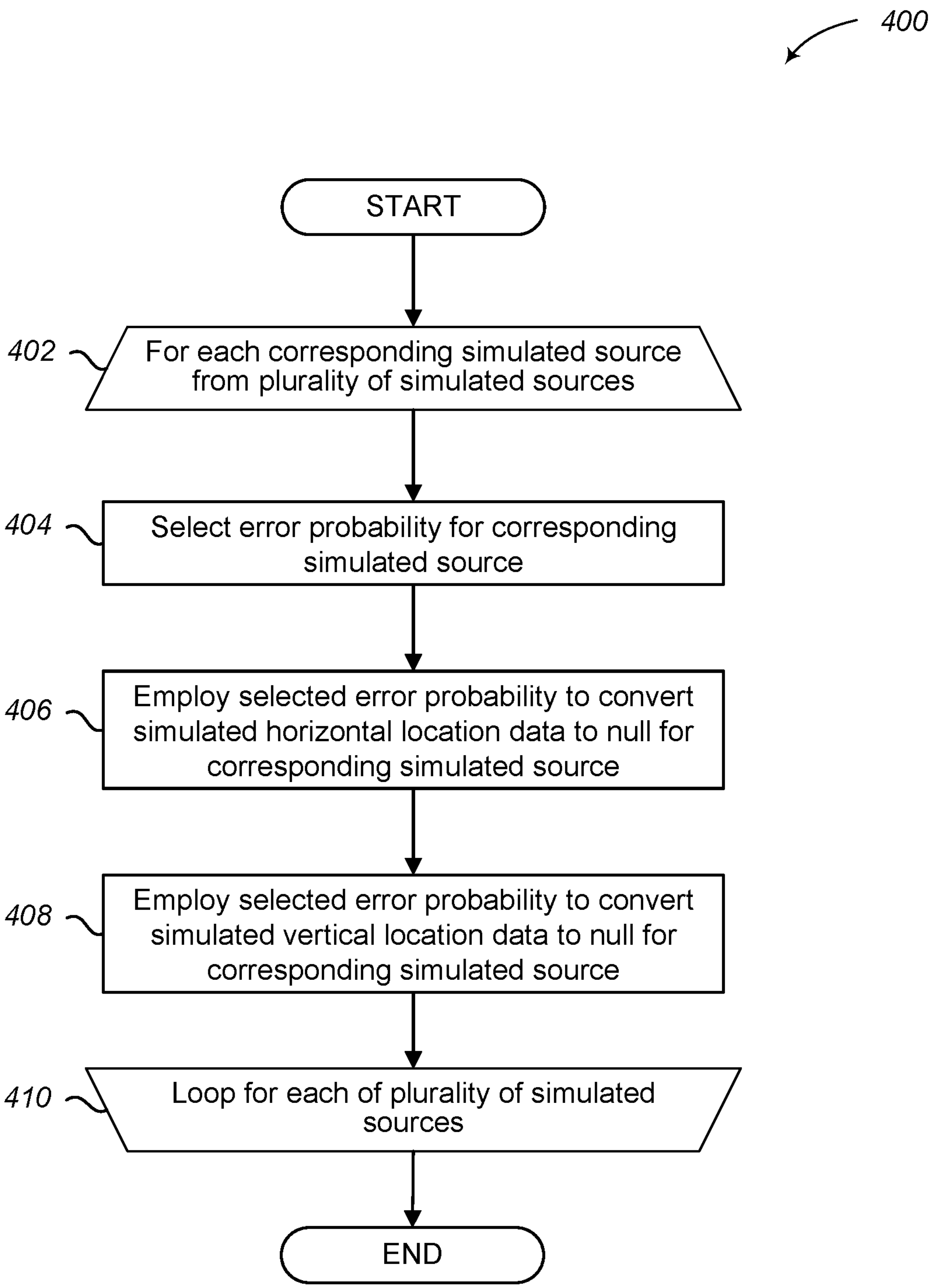
FIG. 4 illustrates a logical flow diagram showing one embodiment of a process for modifying simulated location data from multiple sources in accordance with embodiments described herein.

FIG. 4 illustrates a logical flow diagram showing one embodiment of a process 400 for modifying simulated location data from multiple sources in accordance with embodiments described herein. As noted above, process 400 may be performed as a sub-process at block 204 of process 200 in FIG. 2. Thus, the modified simulated location data generated in process 400 for a plurality of simulated sources are for a particular sequence of simulated location data, which may be the same simulated sources as used in process 300 in FIG. 3.

Process 400 begins, after a start block, at block 402, where each corresponding simulated source is selected from a plurality of simulated sources to be processed.

Process 400 proceeds, after block 402, to block 404, where an error probability is selected for the corresponding simulated source. The error probability is a mathematical value from a relevant statistical model that indicates the odds or likelihood of a simulated source having incorrect or missing location data. In some embodiments, the error probability is set by a user or administrator. In other embodiments, the error probability is defined or obtained based on the actual source from which the simulated source is based. For example, if an actual GPS module provides incomplete data 0.01% of the time, then the error rate of a simulated GPS module would be 0.01%. In yet other embodiments, the error probability may be randomly selected from a range of possible error probabilities.

In some embodiments, the error probability for a simulated source may include a single value for both the simulated horizontal location data and the simulated vertical location data for the simulated source. In other embodiments, the error probability for a simulated source may include two values, one value for the simulated horizontal location data for the simulated source and a second value for the simulated vertical location data for the simulated source. In yet other embodiments, a plurality of error probabilities may be selected for a simulated source. For example, the error probability may include a separate error probability value for the simulated horizontal location, the simulated horizontal location uncertainty, the simulated vertical location, and the simulated vertical location uncertainty, or some combination thereof.

Process 400 continues, after block 404, at block 406, where the selected error probability is employed on the simulated horizontal location data for the corresponding simulated source. Based on the selected error probability, the simulated horizontal location data is converted to a null value (or otherwise set or labeled as undefined or not available) for the corresponding simulated source. One or more mathematical probability theories or relevant statistical models may be employed to determine if the simulated horizontal location data for the corresponding simulated source is converted to a null value. If the selected error probability includes separate values for the simulated horizontal location and the simulated horizontal location uncertainty, then the separate error probability values are employed on the simulated horizontal location and the simulated horizontal location uncertainty to determine if the simulated horizontal location, the simulated horizontal location uncertainty, or both, or neither, are set to null. Accordingly, only the simulated horizontal location for the corresponding simulated source may be nullified, only the simulated horizontal location uncertainty for the corresponding simulated source may be nullified, or both the simulated horizontal location and the simulated horizontal location uncertainty for the corresponding simulated source may be nullified.

Process 400 proceeds, after block 406, to block 408, where the selected error probability is employed on the simulated vertical location data. Based on the selected error probability, the simulated vertical location data is converted to a null value (or otherwise set or labeled as undefined or not available) for the corresponding simulated source. One or more mathematical probability theories or relevant statistical models may be employed to determine if the simulated vertical location data for the corresponding simulated source is converted to a null value. If the selected error probability includes separate values for the simulated vertical location and the simulated vertical location uncertainty, then the separate error probability values are employed on the simulated vertical location and the simulated vertical location uncertainty to determine if the simulated vertical location, the simulated vertical location uncertainty, or both, or neither, are set to null. Accordingly, only the simulated vertical location for the corresponding simulated source may be nullified, only the simulated vertical location uncertainty for the corresponding simulated source may be nullified, or both the simulated vertical location and the simulated vertical location uncertainty for the corresponding simulated source may be nullified.

Process 400 continues, after block 408, at block 410, which loops to block 402 to process each corresponding simulated source to select and employ an error probability on the simulated location data for that corresponding simulated source.

After block 410, process 400 terminates or otherwise returns to a calling process to perform other actions.

Figure 5:
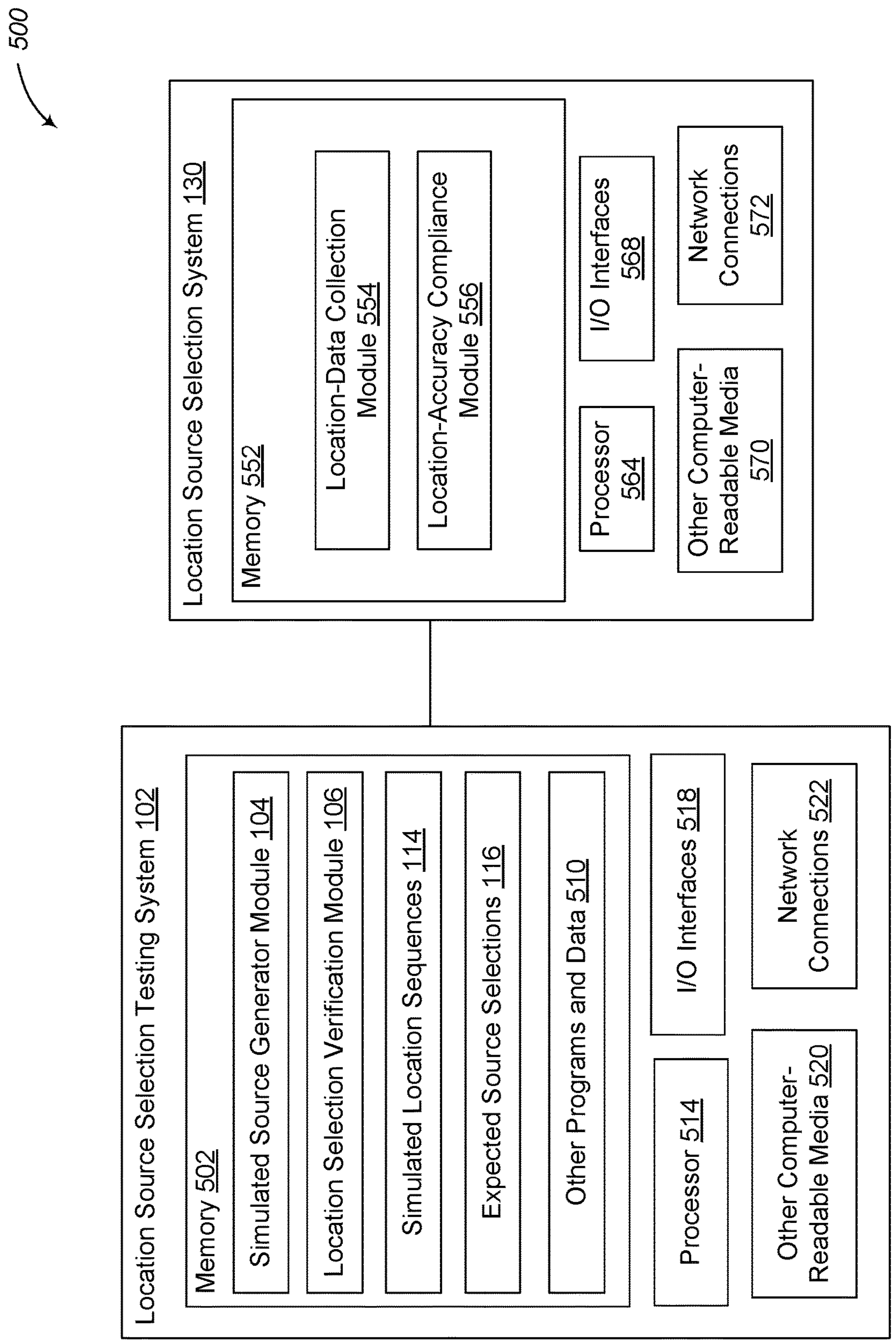
FIG. 5 shows a system diagram that describe various implementations of computing systems for implementing embodiments described herein.

FIG. 5 shows a system diagram that describe various implementations of computing systems for implementing embodiments described herein. System 500 includes a location source selection testing system 102 and a location source selection system 130, similar to what is shown in FIG. 1.

The location source selection testing system 102 is a computing system or environment that generates sequences of simulated location for a plurality of simulated sources and determines whether the location source selection system 130 correctly selects location source data for each sequence, as described herein. One or more special-purpose computing systems may be used to implement the location source selection testing system 102. Accordingly, various embodiments described herein may be implemented in software, hardware, firmware, or in some combination thereof. The location source selection testing system 102 includes memory 502, processor 514, I/O interfaces 518, other computer-readable media 520, and network connections 522.

Processor 514 includes one or more processors, one or more processing units, programmable logic, circuitry, or one or more other computing components that are configured to perform embodiments described herein or to execute computer instructions to perform embodiments described herein. In some embodiments, a processor system of the location source selection testing system 102 may include a single processor 514 that operates individually to perform actions. In other embodiments, a processor system of the location source selection testing system 102 may include a plurality of processors 514 that operate to collectively perform actions, such that one or more processors 514 may operate to perform some, but not all, of such actions. Reference herein to "a processor system" of the location source selection testing system 102 refers to one or more processors 514 that individually or collectively perform actions. And reference herein to "the processor system" of the location source selection testing system 102 refers to I) a subset or all of the one or more processors 514 comprised by "a processor system" of the location source selection testing system 102 and 2) any combination of the one or more processors 514 comprised by "a processor system" of the location source selection testing system 102 and one or more other processors 514.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 502 may be utilized to store information, including computer-readable instructions that are utilized by processor 514 to perform actions, including embodiments described herein.

Memory 502 may have stored thereon simulated source generator module 104 and location selection verification module 106. The simulated source generator module 104 is configured to generate a plurality of sequences (stored as the simulated location sequences 114) of simulated location data for a plurality of simulated sources, as described herein. The location selection verification module 106 compares the expected source selections 116 for the plurality of sequences 114 against location source data selected by the location source selection system 130, as described herein. Memory 502 may also have stored thereon the simulated location sequences 114, expected source selections 116, and other programs and data.

Network connections 522 are configured to communicate with other computing devices, such as location source selection system 130. In various embodiments, the network connections 522 include transmitters and receivers (not illustrated) to send and receive data as described herein. I/O interfaces 518 may include one or more data input or output interfaces, video or display interfaces, or other input/output interfaces. Other computer-readable media 520 may include other types of stationary or removable computer-readable media, such as removable flash drives, external hard drives, or the like.

The location source selection system 130 is a computing system or environment that obtains, receives, or collects simulated location data from the location source selection testing system 102 and selects specific simulated data as if were to be used for location-based services of a user device (e.g., a mobile phone), as described herein. One or more special-purpose computing systems may be used to implement the location source selection system 130. Accordingly, various embodiments described herein may be implemented in software, hardware, firmware, or in some combination thereof. The location source selection system 130 includes memory 552, processor 564, I/O interfaces 568, other computer-readable media 570, and network connections 572.

Processor 564 may be similar to processor 514 to execute computer instructions to perform embodiments described herein related to the functions performed by the location source selection system 130. Memory 552 may be similar to memory 502 and may have stored thereon location-data collection module 554 and location-accuracy compliance module 556. The location-data collection module 554 is configured to receive simulated location sequences 114 from the location source selection testing system 102. And the location-accuracy compliance module 556 is configured to select horizontal location data and vertical location data from one or more simulated sources for each sequence in the simulated location sequences 114, as described herein. The location-accuracy compliance module 556 then provides the selected horizontal location data and vertical location data (or selected simulated source) to the location source selection testing system 102 for verification by the location selection verification module 106. In some embodiments, the location-data collection module 554 and location-accuracy compliance module 556 may be configured to receive or obtain actual location data from a plurality of actual sources to select horizontal location data and vertical location data for a user device that is utilizing a location-based service.

Network connections 572 are configured to communicate with other computing devices, such as location source selection testing system 102. In various embodiments, the network connections 572 include transmitters and receivers (not illustrated) to send and receive data as described herein. I/O interfaces 568 may include one or more data input or output interfaces, video or display interfaces, or other input/output interfaces. Other computer-readable media 570 may include other types of stationary or removable computer-readable media, such as removable flash drives, external hard drives, or the like.

The following is a summarization of the claims as originally filed.

A method may be summarized as comprising: generating a sequence of simulated location data for a plurality of simulated sources for a simulated actual location; modifying the sequence of simulated location data based on an error probability for each of the plurality of simulated sources; setting an expected source selection from the plurality of simulated sources; employing a source selection mechanism on the sequence of simulated location data to determine an actual source selection that represents the simulated actual location; in response to the actual source selection matching the expected source selection, labelling the sequence of simulated location data as a verified selection by the source selection mechanism; and in response to the actual source selection failing to match the expected source selection, labelling the sequence of simulated location data as an anomalous selection by the source selection mechanism.

The method may further comprise: updating the source selection mechanism based on the sequence being labeled anomalous.

The method may further comprise: updating the source selection mechanism based on the labelling of the sequence of simulated location data.

The method may set the expected source selection from the plurality of simulated sources by: selecting a first source from the plurality of simulated sources as having an optimal simulated horizontal location uncertainty for the sequence of simulated location data; and selecting a second source from the plurality of simulated sources as having an optimal simulated vertical location uncertainty for the sequence of simulated location data, wherein the second source is different from the first source.

The method may set the expected source selection from the plurality of simulated sources by: selecting, from the plurality of simulated sources, a simulated source associated with the simulated location data that meets one or more location-accuracy compliance requirements.

The method may generate the sequence of simulated location data for the plurality of simulated sources by: for each corresponding simulated source of the plurality of simulated sources: selecting a horizontal location uncertainty; selecting a vertical location uncertainty; selecting a simulated horizontal location based on the simulated actual location and the horizontal location uncertainty; and selecting a simulated vertical location based on the simulated actual location and the vertical location uncertainty.

The method may modify the sequence of simulated location data by: nullifying simulated horizontal location data for a simulated source of the plurality of sources based on the error probability for the simulated source.

The method may modify the sequence of simulated location data by: nullifying simulated vertical location data for a simulated source of the plurality of sources based on the error probability for the simulated source.

A system may be summarized as comprising: a location source selection system and a location source selection testing system. The location source selection system is configured to: employ a source selection mechanism on a sequence of simulated location data for a plurality of simulated sources to determine an actual source selection that represents a simulated actual location. And the location source selection testing system is configured to: generate the sequence of simulated location data for the plurality of simulated sources for the simulated actual location; assign an expected source selection from the plurality of simulated sources for the sequence of simulated location data; provide the sequence of simulated location data to the location source selection system; receive the actual source selection from the location source selection system in response to the location source selection system employing the source selection mechanism on the sequence of simulated location data; in response to the actual source selection matching the expected source selection, label the sequence of simulated location data as a verified selection by the source selection mechanism; and in response to the actual source selection failing to match the expected source selection, label the sequence of simulated location data as an anomalous selection by the source selection mechanism.

The location source selection testing system may be further configured to: modify the sequence of simulated location data based on an error probability for each of the plurality of simulated sources.

The location source selection testing system may be further configured to: nullify simulated horizontal location data for a simulated source of the plurality of sources based on an error probability for the simulated source.

The location source selection testing system may be further configured to: nullify simulated vertical location data for a simulated source of the plurality of sources based on an error probability for the simulated source.

The location source selection testing system may assign the expected source selection for the sequence of simulated location data by being further configured to: select a first source from the plurality of simulated sources as having an optimal simulated horizontal location uncertainty for the sequence of simulated location data; and select a second source from the plurality of simulated sources as having an optimal simulated vertical location uncertainty for the sequence of simulated location data, wherein the second source is different from the first source.

The location source selection testing system may assign the expected source selection for the sequence of simulated location data by being further configured to: select, from the plurality of simulated sources, a simulated source associated with the simulated location data that meets one or more location-accuracy compliance requirements.

The location source selection testing system may generate the sequence of simulated location data for the plurality of simulated sources by being further configured to: for each corresponding simulated source of the plurality of simulated sources: select a horizontal location uncertainty; select a vertical location uncertainty; select a simulated horizontal location based on the simulated actual location and the horizontal location uncertainty; and select a simulated vertical location based on the simulated actual location and the vertical location uncertainty.

The location source selection system may be further configured to: update the source selection mechanism based on the sequence being labeled anomalous.

The location source selection system may be further configured to: update the source selection mechanism based on the labelling of the sequence of simulated location data.

A computing device may be summarized as comprising: a memory configured to store computer instructions; and a processor system configured to execute the computer instructions to: generate a plurality of sequences of simulated location data for a plurality of simulated sources, wherein each corresponding sequence of the plurality of sequences includes a plurality of simulated location data for a corresponding simulated actual location; for each corresponding sequence of the plurality of sequences: set an expected source selection from the plurality of simulated sources for the corresponding sequence; obtain, in response to employment of a source selection mechanism on the corresponding sequence of simulated location data, an actual source selection that represents the corresponding simulated actual location for the corresponding sequence; and in response to the actual source selection for the corresponding sequence failing to match the expected source selection for the corresponding sequence, label the corresponding sequence of simulated location data as an anomalous selection by the source selection mechanism.

The processor system of the computing device may be configured to further execute the computer instructions to:

update the source selection mechanism based on at least one sequence being labeled anomalous.

The processor system of the computing device may be configured to generate the plurality of sequences of simulated location data by further executing the computer instructions to: for each corresponding sequence of the plurality of sequences: for each corresponding simulated source of the plurality of simulated sources; select a horizontal location uncertainty for the corresponding simulated source of the corresponding sequence; select a vertical location uncertainty for the corresponding simulated source of the corresponding sequence; select a simulated horizontal location for the corresponding simulated source of the corresponding sequence based on the simulated actual location and the horizontal location uncertainty; and select a simulated vertical location for the corresponding simulated source of the corresponding sequence based on the simulated actual location and the vertical location uncertainty.

The various embodiments described above can be combined to provide further embodiments. All of the U.S. patents, U.S. patent application publications, and U.S. patent applications referred to in this specification are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

generating, by a computing device, a sequence of simulated location data for a plurality of simulated sources for a simulated actual location, wherein the sequence of simulated location data includes simulated horizonal location data and simulated vertical location data for each separate simulated source of the plurality of simulated sources;

modifying, by the computing device, the sequence of simulated location data based on an error probability for each of the plurality of simulated sources;

setting, by the computing device, an expected source selection from the plurality of simulated sources;

employing, by the computing device, a source selection mechanism on the sequence of simulated location data to determine an actual source selection that represents the simulated actual location, the source selection mechanism is configured to dynamically select location data that meets location-accuracy compliance requirements for user devices using location-based services;

in response to the actual source selection matching the expected source selection, labelling, by the computing device, the sequence of simulated location data as a verified selection by the source selection mechanism;

in response to the actual source selection failing to match the expected source selection, labelling, by the computing device, the sequence of simulated location data as an anomalous selection by the source selection mechanism; and updating, by the computing device, the source selection mechanism based on the labelling of the sequence of simulated location data.

2. The method of claim 1, wherein updating the source selection mechanism comprises:

updating, by the computing device, the source selection mechanism based on the sequence being labeled anomalous.

3. The method of claim 1, wherein setting the expected source selection from the plurality of simulated sources comprises:

selecting, by the computing device, a first source from the plurality of simulated sources as having an optimal simulated horizontal location uncertainty for the sequence of simulated location data; and selecting, by the computing device, a second source from the plurality of simulated sources as having an optimal simulated vertical location uncertainty for the sequence of simulated location data, wherein the second source is different from the first source.

4. The method of claim 1, wherein setting the expected source selection from the plurality of simulated sources comprises:

selecting, by the computing device and from the plurality of simulated sources, a simulated source associated with the simulated location data that meets one or more location-accuracy compliance requirements.

5. The method of claim 1, wherein generating the sequence of simulated location data for the plurality of simulated sources comprises:

for each corresponding simulated source of the plurality of simulated sources:

selecting a horizontal location uncertainty;

selecting a vertical location uncertainty;

selecting a simulated horizontal location based on the simulated actual location and the horizontal location uncertainty; and selecting a simulated vertical location based on the simulated actual location and the vertical location uncertainty.

6. The method of claim 1, wherein modifying the sequence of simulated location data comprises:

nullifying, by the computing device, simulated horizontal location data for a simulated source of the plurality of sources based on the error probability for the simulated source.

7. The method of claim 1, wherein modifying the sequence of simulated location data comprises:

nullifying, by the computing device, simulated vertical location data for a simulated source of the plurality of sources based on the error probability for the simulated source.

8. A system, comprising:

a location source selection system configured to:

employ a source selection mechanism on a sequence of simulated location data for a plurality of simulated sources to determine an actual source selection that represents a simulated actual location, wherein the source selection mechanism is configured to dynamically select location data that meets location-accuracy compliance requirements for user devices using location-based services, and wherein the sequence of simulated location data includes simulated horizonal location data and simulated vertical location data for each separate simulated source of the plurality of simulated sources;

a location source selection testing system configured to:

generate the sequence of simulated location data for the plurality of simulated sources for the simulated actual location;

assign an expected source selection from the plurality of simulated sources for the sequence of simulated location data;

provide the sequence of simulated location data to the location source selection system;

receive the actual source selection from the location source selection system in response to the location source selection system employing the source selection mechanism on the sequence of simulated location data;

in response to the actual source selection matching the expected source selection, label the sequence of simulated location data as a verified selection by the source selection mechanism;

in response to the actual source selection failing to match the expected source selection, label the sequence of simulated location data as an anomalous selection by the source selection mechanism; and cause the source selection mechanism to be updated based on the labelling of the sequence of simulated location data.

9. The system of claim 8, wherein the location source selection testing system is further configured to:

modify the sequence of simulated location data based on an error probability for each of the plurality of simulated sources.

10. The system of claim 8, wherein the location source selection testing system is further configured to:

nullify simulated horizontal location data for a simulated source of the plurality of sources based on an error probability for the simulated source.

11. The system of claim 8, wherein the location source selection testing system is further configured to:

nullify simulated vertical location data for a simulated source of the plurality of sources based on an error probability for the simulated source.

12. The system of claim 8, wherein the location source selection testing system assigns the expected source selection for the sequence of simulated location data by being further configured to:

select a first source from the plurality of simulated sources as having an optimal simulated horizontal location uncertainty for the sequence of simulated location data; and select a second source from the plurality of simulated sources as having an optimal simulated vertical location uncertainty for the sequence of simulated location data, wherein the second source is different from the first source.

13. The system of claim 8, wherein the location source selection testing system assigns the expected source selection for the sequence of simulated location data by being further configured to:

select, from the plurality of simulated sources, a simulated source associated with the simulated location data that meets one or more location-accuracy compliance requirements.

14. The system of claim 8, wherein the location source selection testing system generates the sequence of simulated location data for the plurality of simulated sources by being further configured to:

for each corresponding simulated source of the plurality of simulated sources:

select a horizontal location uncertainty;

select a vertical location uncertainty;

select a simulated horizontal location based on the simulated actual location and the horizontal location uncertainty; and select a simulated vertical location based on the simulated actual location and the vertical location uncertainty.

15. The system of claim 8, wherein the location source selection system is further configured to:

update the source selection mechanism based on the sequence being labeled anomalous.

16. The system of claim 8, wherein the location source selection system is further configured to:

update the source selection mechanism based on the labelling of the sequence of simulated location data.

17. A computing device, comprising:

a memory configured to store computer instructions; and a processor system configured to execute the computer instructions to:

generate a plurality of sequences of simulated location data for a plurality of simulated sources, wherein each corresponding sequence of the plurality of sequences includes a plurality of simulated location data for a corresponding simulated actual location, wherein the sequence of simulated location data includes simulated horizonal location data and simulated vertical location data for each separate simulated source of the plurality of simulated sources;

for each corresponding sequence of the plurality of sequences:

set an expected source selection from the plurality of simulated sources for the corresponding sequence;

obtain, in response to employment of a source selection mechanism on the corresponding sequence of simulated location data, an actual source selection that represents the corresponding simulated actual location for the corresponding sequence, wherein the source selection mechanism is configured to dynamically select location data that meets location-accuracy compliance requirements for user devices using location-based services; and in response to the actual source selection for the corresponding sequence failing to match the expected source selection for the corresponding sequence, label the corresponding sequence of simulated location data as an anomalous selection by the source selection mechanism.

18. The computing device of claim 17, wherein the processor system is configured to further execute the computer instructions to:

update the source selection mechanism based on at least one sequence being labeled anomalous.

19. The computing device of claim 17, wherein the processor system is configured to generate the plurality of sequences of simulated location data by further executing the computer instructions to:

for each corresponding sequence of the plurality of sequences:

for each corresponding simulated source of the plurality of simulated sources;

select a horizontal location uncertainty for the corresponding simulated source of the corresponding sequence;

select a vertical location uncertainty for the corresponding simulated source of the corresponding sequence;

select a simulated horizontal location for the corresponding simulated source of the corresponding sequence based on the simulated actual location and the horizontal location uncertainty; and select a simulated vertical location for the corresponding simulated source of the corresponding sequence based on the simulated actual location and the vertical location uncertainty.

* * * * *